US008921735B2

(12) United States Patent
Helf et al.

(10) Patent No.: US 8,921,735 B2
(45) Date of Patent: Dec. 30, 2014

(54) PORTABLE GENERATOR AND AIR COMPRESSOR MOUNTING ARRANGEMENT

(75) Inventors: Joseph N. Helf, Appleton, WI (US); John P. Laitala, Appleton, WI (US); Eric M. Kropp, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1803 days.

(21) Appl. No.: 11/742,311

(22) Filed: Apr. 30, 2007

(65) Prior Publication Data

US 2008/0264919 A1   Oct. 30, 2008

(51) Int. Cl.
  *B23K 9/10* (2006.01)
  *F04C 18/16* (2006.01)
  *F04C 29/00* (2006.01)

(52) U.S. Cl.
  CPC .............. *F04C 18/16* (2013.01); *F04C 29/005* (2013.01)
  USPC ........................................................ 219/133

(58) Field of Classification Search
  USPC ............ 219/133; 248/557; 417/313; 474/101
  See application file for complete search history.

(56) References Cited

U.S. PATENT DOCUMENTS

| | | | | |
|---|---|---|---|---|
| 5,449,140 A | * | 9/1995 | Lastowski | 248/681 |
| 6,547,527 B2 | | 4/2003 | Gaither | |
| 6,652,401 B2 | * | 11/2003 | Liu | 474/134 |
| 6,989,509 B2 | * | 1/2006 | Silvestro | 219/133 |
| 7,098,424 B2 | * | 8/2006 | Silvestro | 219/133 |
| 2005/0155959 A1 | | 7/2005 | Bender et al. | |
| 2006/0027547 A1 | * | 2/2006 | Silvestro | 219/133 |

FOREIGN PATENT DOCUMENTS

| | | |
|---|---|---|
| EP | 1459832 | 9/2004 |
| JP | 59099038 | 6/1984 |
| JP | 59100018 | 6/1984 |
| JP | 2007001442 | 1/2007 |
| KR | 20040042175 | 5/2004 |

OTHER PUBLICATIONS

The Space Saver by Certified Truck Bodies www.certifiedtruckbodies.com.
Certified Truck Bodies Original Products www.certifiedtruckbodies.com/pages_single/compressors.htm.
U.S. Appl. No. 11/742,378, Kropp et al.
U.S. Appl. No. 11/742,399, Fosbinder.

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A system, in one embodiment, may include a chassis, an engine coupled to the chassis, a generator coupled to the engine, and a rotary screw compressor coupled to the chassis independent from the engine. The engine may be configured to drive both the generator and the rotary screw compressor. A method, according to another embodiment, may include isolating a rotary air compressor from an engine and a generator in a common chassis. The isolating may include separately mounting the rotary air compressor and the engine with a resilient or distance adjustable connection in between. The isolating also may include resiliently mounting the engine, or the rotary air compressor, or both.

26 Claims, 5 Drawing Sheets

PORTABLE GENERATOR AND AIR COMPRESSOR MOUNTING ARRANGEMENT

BACKGROUND

The invention relates generally to welding systems and more particularly to welding systems utilizing an engine coupled to an air compressor and welding generator in a single unit.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites.

In addition to needing a source of welding current at a worksite, welding operators often desire other outputs to more efficiently complete a job. For example, a welding operator may also use compressed air to operate plasma cutters, air tools and the like. Typically, compressed air is provided via a standalone air supply. Thus, a welding operator may use, both, a standalone engine-driven welding generator and a standalone air supply. The independence of the two units may increase the amount of time and labor involved with setup, transportation, and so forth. In addition, the independence of the two units may result in an increased amount of maintenance and repair costs due to duplication of parts.

BRIEF DESCRIPTION

A system, in one embodiment, may include a chassis, an engine coupled to the chassis, a generator coupled to the engine, and a rotary screw compressor coupled to the chassis independent from the engine. The engine may be configured to drive both the generator and the rotary screw compressor.

A method, according to another embodiment, may include isolating a rotary air compressor from an engine and a generator in a common chassis. The isolating may include separately mounting the rotary air compressor and the engine with a resilient or distance adjustable connection in between. The isolating also may include resiliently mounting the engine, or the rotary air compressor, or both.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
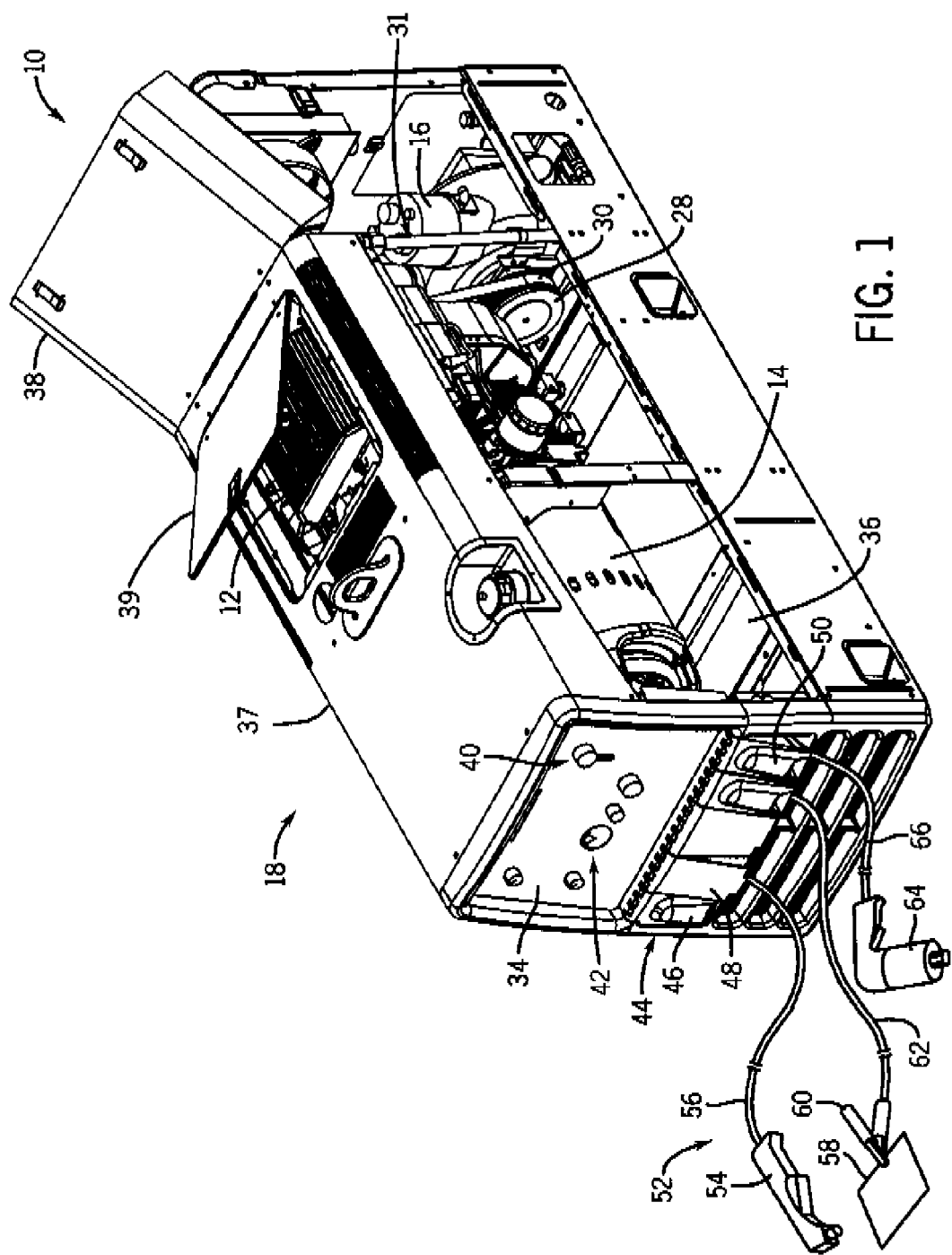
FIG. 1 is a partial perspective view of an exemplary engine-driven welding generator/compressor system, wherein two top access panels are rotated to open positions and a side access panel is removed to reveal various internal features in accordance with embodiments of the present invention.
Figure 2:
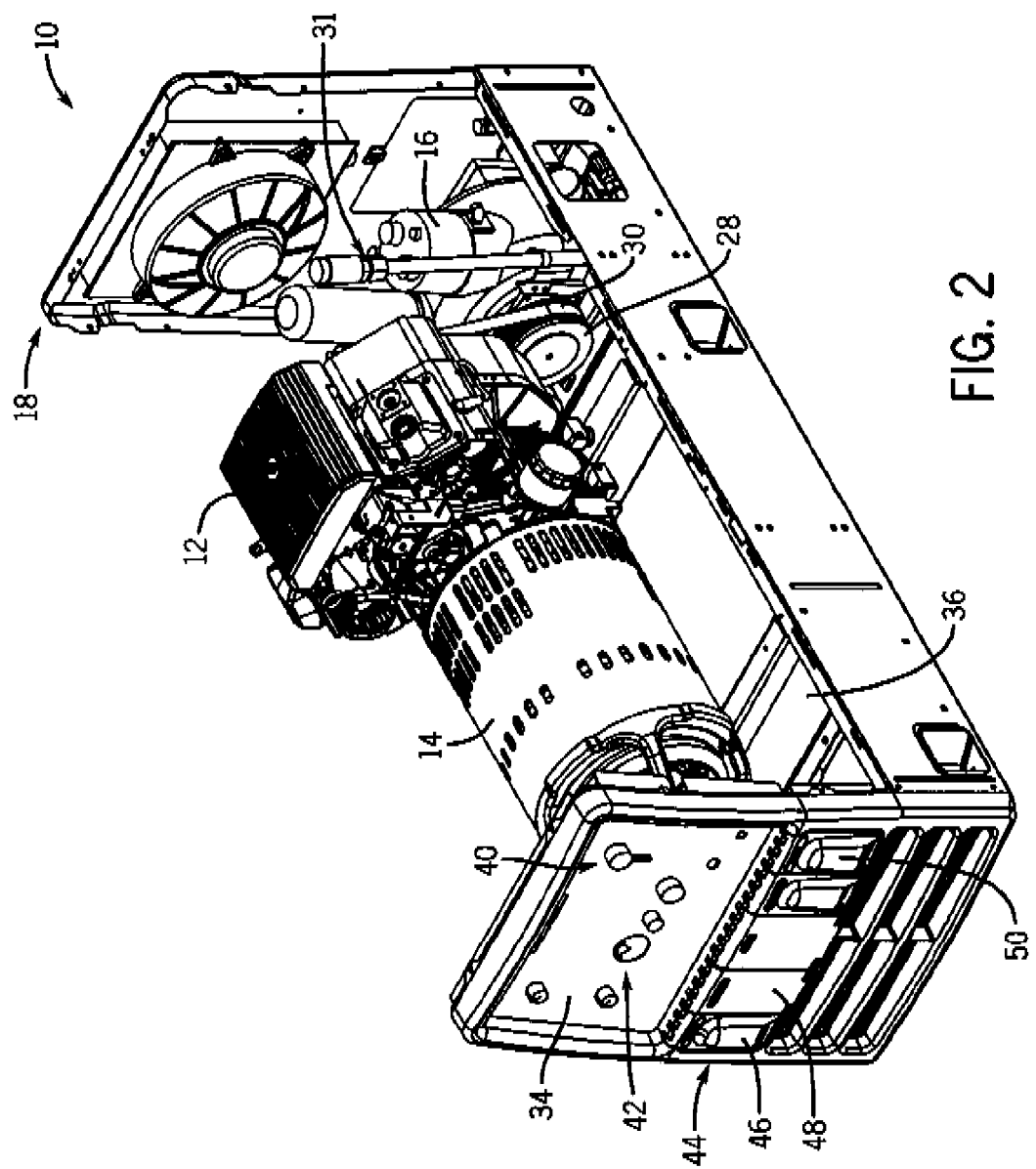
FIG. 2 is another partial perspective view of the welding generator/compressor system as illustrated in FIG. 1, wherein an entire top access panel assembly is removed to further illustrate various internal features in accordance with embodiments of the present invention.
Figure 3:
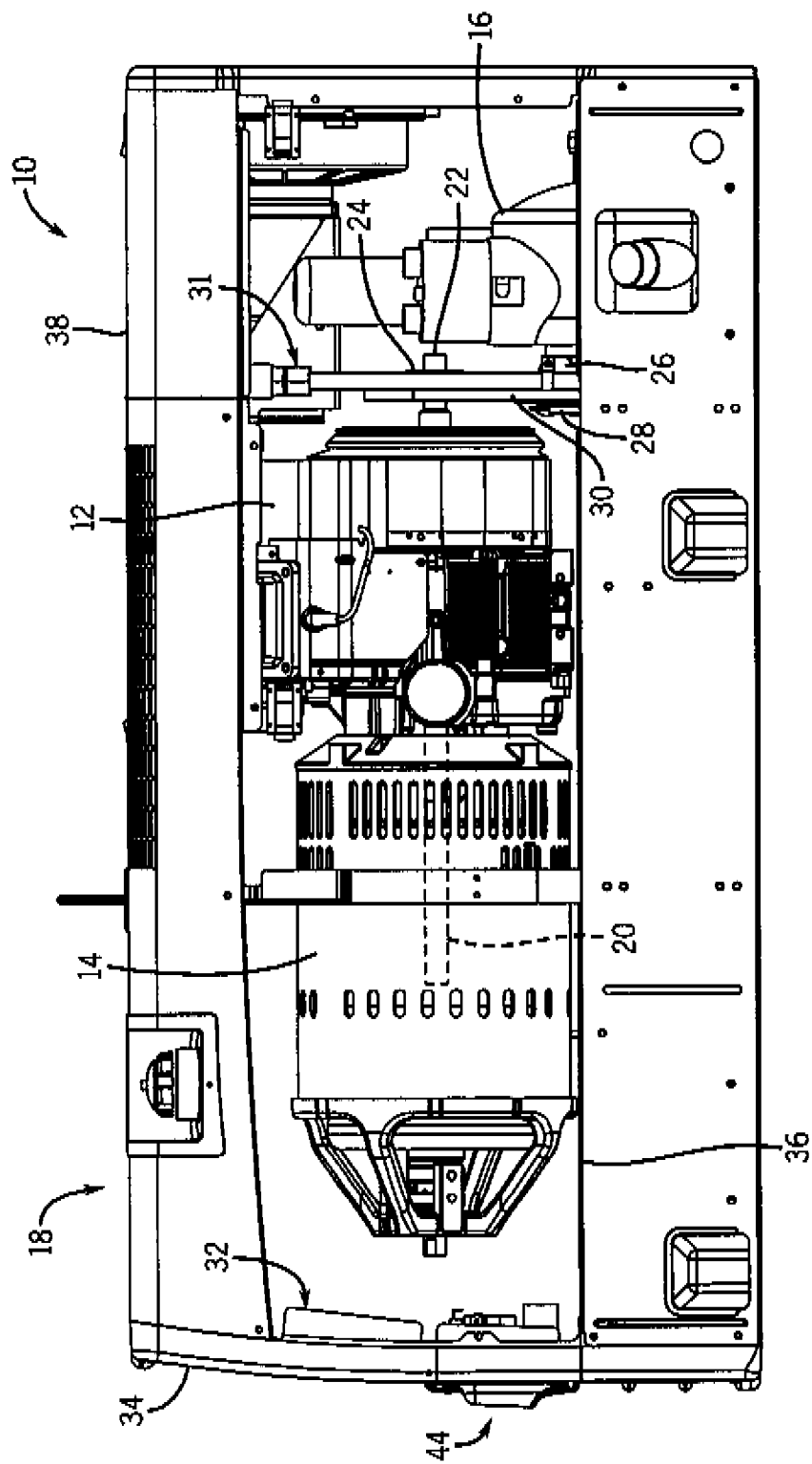
FIG. 3 is a side view of the welding generator/compressor system as illustrated in FIG. 1, wherein the two top access panels are rotated to closed positions and the side access panel is removed to further illustrate various internal features in accordance with embodiments of the present invention.

Referring now to the drawings, FIGS. 1-3 illustrate an engine-driven welding generator/compressor system 10 having an engine 12 drivingly coupled to a welding generator 14 and an air compressor 16 in a single enclosure 18 in accordance with an exemplary embodiment of the present technique. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. FIG. 3 is a side view of the system 10 as illustrated in FIGS. 1 and 2. As depicted, the system 10 is configured to provide multiple outputs, including welding current, alternating current (AC) power, and compressed air.

As discussed in detail below, the illustrated system includes a variety of features to improve serviceability, reliability, controllability, and integration of the air compressor 16 within the single enclosure 18 of the system 10. For example, the illustrated system 10 may include a top side oil fill to enable access at the top of the system 10, rather than a lower or more inaccessible oil fill location. The illustrated system 10 also may include unique control features, such as a load priority control configured to monitor various loads (e.g., generator 14, compressor 16, external loads, etc.) on the engine 12, identify possible overload conditions, and adjust the various loads based on priority levels. The control features also may include a specific air compressor load control, which may be configured to reduce the engine speed and/or gradually engage (e.g., via a clutch) the air compressor 16 during start up (e.g., a soft start control). Furthermore, the control features may include a specific air compressor control regulator, which may be mounted directly on a control panel (e.g., a front panel) of the system 10 rather than being in an inaccessible position well within the system 10. The system 10 also may include a battery and/or a battery charge system, which may include features to monitor conditions of the battery (e.g., internal or external to the system 10) and to adjust the characteristics of the charge (e.g., variable output level, duration, etc.).

In certain embodiments, the system 10 may be described as an air pack welding system (e.g., AIRPAK). The engine 12 provides output power (e.g., a mechanical output) to drive both the welding generator 14 and the air compressor 16. In the illustrated embodiment, the generator 14 is coupled to one side of the engine 12, while the compressor 16 is independently coupled to an opposite side of the engine 12. Thus, the engine 12 is sandwiched between the generator 14 and the compressor 16. In addition, the engine 12 may be mounted independently from the compressor 16, such that the two are mechanically isolated from one another. As discussed in further detail below, the isolation between the compressor 16 and the engine 12 may be addressed with a suitable engine-to-compressor coupling system, such as a geometrically adjustable coupling. The geometrically adjustable coupling may include a tensioning system coupled to a belt and pulley system, a special resilient or spring-like belt, a clutch, or a combination thereof to provide some degree of flexibility, positional adjustability, or play. Thus, the geometrically adjustable coupling is configured to maintain a connection between the compressor 16 and the engine 12 despite variations in distance, vibrations, and so forth. In other words, the geometrically adjustable coupling provides a resilient or distance adjustable connection between the engine 12 and the compressor 16

As described below, the power from the engine 12 operates both the generator 14 and the air compressor 16 via a first shaft 20 and a second shaft 22 (e.g., stub shaft), respectively. In some embodiments, these shafts 20 and 22 may be independent from one another, while in other embodiments shafts 20 and 22 may be part of a single shaft extending through the engine 12. As illustrated, the shafts 20 and 22 extend out of opposite sides of the engine 12. These shafts 20 and 22 may be directly or indirectly coupled to one or more driven mechanisms. For example, an indirect coupling may include a belt and pulley system, a gear system, or a chain and sprocket system. In the present embodiment, the first shaft 20 couples directly to the generator 14, while the second stub shaft 22 couples indirectly to the compressor 16. However, either arrangement can be used for the connection between the engine 12 and the generator 14 and/or the compressor 16.

For example, as will be discussed in greater detail below, the engine 12 is coupled to the compressor 16 via a belt and pulley system including the stub shaft 22, a pulley 24 coupled to the shaft 22, a compressor drive shaft 26 coupled to the compressor 16, a compressor pulley 28 coupled to the shaft 26, and a drive belt 30 extending about the pulleys 24 and 28. Therefore, the engine 12 is capable of providing power to the generator 14 and the air compressor 16 simultaneously. In the illustrated embodiment, the engine 12 rotates the stub shaft 22 to transmit rotation and torque via the pulleys 24 and 28 and drive belt 30 to the compressor drive shaft 26 coupled to the air compressor 16. Accordingly, the mechanical energy generated by the engine 12 operates the air compressor 16. As discussed in detail below, in certain embodiments, the air compressor 16 includes a rotary screw compressor. Thus, the air compressor 16 and the system 10 may be capable of continuously providing large volumes of compressed air 16 to a desired application, such as a welding application, without any need for an intermediate storage tank.

As discussed in further detail below with reference to FIGS. 4-6, an embodiment of the system 10 includes a belt tensioner 68 that reduces slack in the drive belt 30 and maintains tension to transfer torque from the stub shaft 22 to the air compressor 16. Moreover, the belt tensioner 68 may provide for simplified mounting of the drive belt 30 and compensating for misalignment of the engine 12, the stub shaft 22, and/or the compressor drive shaft 26. For example, the belt tensioner 68 may reduce stresses due to vibrations, wear and assembly. Furthermore, embodiments include isolating the engine 12 from other components via isolators 86. The isolators 86 may be configured reduce the transmission of vibrations from the engine 12 to the other components in the system and/or may reduce the stresses of misalignments due to wear and assembly.

Returning to FIGS. 1-3, the engine 12 includes a power source configured to provide power to the generator 14 and the air compressor 16. In an embodiment, the engine 12 may include a combustion engine powered by gas, diesel, LP fuel, natural gas, or other fuel, and driving one or more drive shafts, e.g., 20 and 22. For example, the engine 12 may include an industrial gas/diesel engine configured to output anywhere from about 24 horsepower (Hp) to about 64 Hp. Generally, the weight of such an engine 12 may vary with the size and Hp rating of the engine, For example, a 64 Hp diesel engine driven unit may weigh approximately 1900 lbs., whereas a similar 24 Hp gasoline engine driven unit may weigh less than approximately 1000 lbs. Thus, the portable system 10 may benefit from the use of a smaller engine 12.

As discussed previously, embodiments may include a generator 14 coupled to the engine 12. Thus, the generator 14 may convert the power output (e.g., mechanical energy) of the engine 12 to electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include the rotating drive shaft 20 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs. As suggested above, multiple generators 14 may be connected to the drive shaft 20 or stub shaft 22.

Also coupled to the engine 12, the air compressor 16 may provide a continuous source of compressed air for use in plasma cutting, pneumatic tools, inflating a tire, blowing-off/cleaning a work piece, and the like. For example, a welding operator may use compressed air as a high speed gas ejected from the nozzle of a plasma torch, or may use compressed air to operate tools, such as pneumatic impact wrenches, pneumatic spray guns, pneumatic lifts, and pneumatic air chisels. In the illustrated embodiment, the air compressor 16 may be described as a continuous air supply compressor, an indirect mount air compressor, or both. For example, certain embodiments of the system 10 use a type of the compressor 16 that is not a piston-type air compressor mounted directly to the engine 12. In an embodiment, the air compressor 16 may include a rotary screw compressor or another suitable compressor 16 configured to supply a continuous flow of compressed air without the need for an intermediate storage tank.

Rotary screw compressors may include a type of gas compressor that has a rotary type positive displacement mechanism. The rotary screw compressor typically includes one or more screws, which rotate within an enclosure to gradually shrink a series of passages defined by threads of the screws and the surrounding enclosure. For example, the rotary screw compressor may include a plurality (e.g., pair) of counter rotating screws, which intermesh with one another to progressively reduce air volumes between the intermeshed threads (e.g., a series of shrinking volumes of air). For example, air is drawn in through an inlet port in the enclosure, the gas is captured in a cavity, the gas is compressed as the cavity reduces in volume, and the gas is finally discharged through another port in the enclosure. The design of a rotary screw air compressor 16 generally provides for high volumes of compressed gas in a continuous manner without the need for an intermediate storage tank.

Accordingly, the rotary screw air compressor 16 may provide a direct supply of compressed air on-demand to a desired application. For example, a plasma cutter may consume air directly from the unit without the air being compressed into a tank, as generally done by piston-driven air compressors. However, an embodiment including a rotary screw air compressor 16 may include an air tank configured to store the compressed air. For example, a user may want to generate air for a given period and store the compressed air for a later use.

Further, the rotary screw air compressor 16 may be configured to operate at high speeds and, thus, may use less gearing and space to couple the rotary screw air compressor 16 to the engine 124 For example, in an embodiment, the system 10 may include a rotary screw air compressor 16 operating at speed near the engine speed, such as 4000 rpm. Thus, the pulley 24 and the compressor pulley 18 may include similar 1 to 1 ratios and not use a significantly larger compressor pulley 28 to step down the engine speed to accommodate the air compressor 16.

The system 10 may also have an oil fill assembly 31 that enables a user to perform regular maintenance on the air compressor 16. For example, as depicted, the oil fill assembly 31 may include a configuration to provide improved access to components of the air compressor 16 that may otherwise be obscured by other devices within the system 10. Accordingly a user may easily check and add fluids to the air compressor 16. For example, the oil fill assembly 31 may be described as an extension, add-on, or retrofit system configured to relocate the oil fill location from well within the system 10 to a top access location.

The system 10 may also include control circuitry to coordinate functions of a plurality of devices. For example, as depicted in FIGS. 1-3, the system 10 includes control circuitry 32 in the vicinity of a control panel 34. In an embodiment, the control circuitry 32 may include a processor, memory, and software code configured to control and or coordinate operation of the system 10. For example, the control circuitry 32 may monitor and control the speed and load on the engine 12, the electrical output and loads on the generator 14, the air output and loads on the compressor 16, the startup procedures (e.g., soft start of compressor 16), and/or the like. For example, as mentioned above, the control circuitry 32 may identify an overload condition in response to sensed data, and then reduce the output to protect the system 10. The control circuitry 32 also may reduce the engine speed, gradually increase the engine speed, and/or gradually engage a clutch during start up of the compressor 16. The control circuitry 32 also may automatically adjust the outputs (e.g., compressed air output or electrical output) based on default or user defined priority levels, minimum workout output levels, maximum output levels, safety features, and so forth. The control circuitry 32 also may adjust output levels (e.g., compressed air output or electrical output) based on a particular application, sensed feedback, and other closed-loop controls. For example, the control circuitry 32 may gradually decrease an electrical output for a battery charging procedure based on sensed feedback from the battery, thereby maximizing the charge without overcharging the battery.

As depicted in FIGS. 1-3, the enclosure 18 includes a common base or frame 36 with various access panels to enable servicing, repair, and so forth. For example, a pair of side access panels (removed) is configured to attach to opposite sides of the frame 36. A top 37 of the enclosure 18 includes first and second access panels or hatches 38 and 39, which are both rotatable between open and closed positions above the components of the system 10. As illustrated, the first hatch 38 can rotate open to enable access to the compressor 16, the oil fill assembly 31, and other features. The second hatch 39 can rotate open to enable access to the engine 12 and other features.

As depicted, the control panel 34 is coupled to an end of the enclosure 18 near the generator 14. The control panel 34 may include various control inputs, indicators, displays, electrical outputs, air outputs, and so forth. In an embodiment, a user input 40 may include a knob or button configured for a mode of operation, an output level or type, etc. For instance, the user input 40 may include a dial to select a mode of operation, such as a DC weld, an AC weld, a battery charge, or an air tool operation. Other embodiments may include routing air from the compressor 16 out of other location within the system 10, such as a side proximate to the air compressor 16. The control panel 34 may also include various indicators 42 to provide feedback to the user. For example, the indicator 42 may include an LCD, LED, or Vacuum Florescent display to display voltage, amperage, air pressure, and the like. Embodiments of the control panel 34 include any number inputs and outputs, such as welding methods, air compressor settings, oil pressure, oil temperature, and system power. Further, the user inputs 40 and indicators 42 may be electrically coupled to the control circuitry 32 and enable a user to set and monitor various parameters within the control circuitry 32 and other devices of the system 10.

The illustrated system 10 also includes various external connections 44. The external connections 44 may include various outlets and couplers configured to provide access to the electrical power and the compressed air generated by the system 10. For example, the illustrated external connections 44 include an AC power output 46, a DC power output 48, and a compressed air output 50. In an embodiment these outputs 46, 48 and 50 are coupled to various devices and tools. For example, the AC power output 46 or the DC power output 48 can be coupled to various welding and cutting tools 52. As depicted, the welding/cutting tools 52 included a torch 54 coupled to the external connection 44 via a supply conduit 56. For instance, the welding devices may receive current from the generator 14 via the external connections 44. In such an embodiment, the torch 54 may be used to weld or cut a work piece 58 coupled to the external connections 44 via a work clamp 60 and a cable 62. As will be appreciated, the torch 54 may include various welding devices, such as a TIG (tungsten inert gas) torch, a MIG (metal inert gas) gun, or a plasma cutting torch. Similarly, the system 10 may provide compressed air from the air compressor 16 via the compressed air output 50. For example an air tool 64 may be coupled to the compressed air output 50 via an air hose 66. The air hose 66 may exit the system 10 at various other locations; including the back of the system 10 proximate to the air compressor 16. The air tool 64 may include various pneumatic tools and the like. In another embodiment, a plasma cutting torch 54 may receive power from an external unit (e.g., wall outlet AC power) while receiving compressed air from the air compressor 16 of the system 10.

As discussed previously, the system 10 may include multiple components working in cooperation to generate power, compressed air, and other outputs. For example, in the illustrated embodiment, a single engine 12 is coupled to the generator 14 and the air compressor 16. As will be appreciated, mechanical design of such a system 10 may entail various arrangements of components to provide an efficient and reliable system 10. For instance, if the components are not positioned correctly with respect to one another, then the misalignment may cause premature wear and/or failure of the system 10 and its components. For example, misalignment of the stub shaft 22 may reduce the efficiency of the system and create additional wear on bearings within the air compressor 16 or the engine 12. Further, each of the components may have a tendency to vibrate and, thus, increase the wear potential on surrounding components. Such a vibration may also reduce the appeal to operators, as the system 10 may not run as quietly and smoothly as desired. As discussed in further detail below, various features of the system 10 are configured to align and isolate components, including the engine 12 and the air compressor 16.

Figure 4:
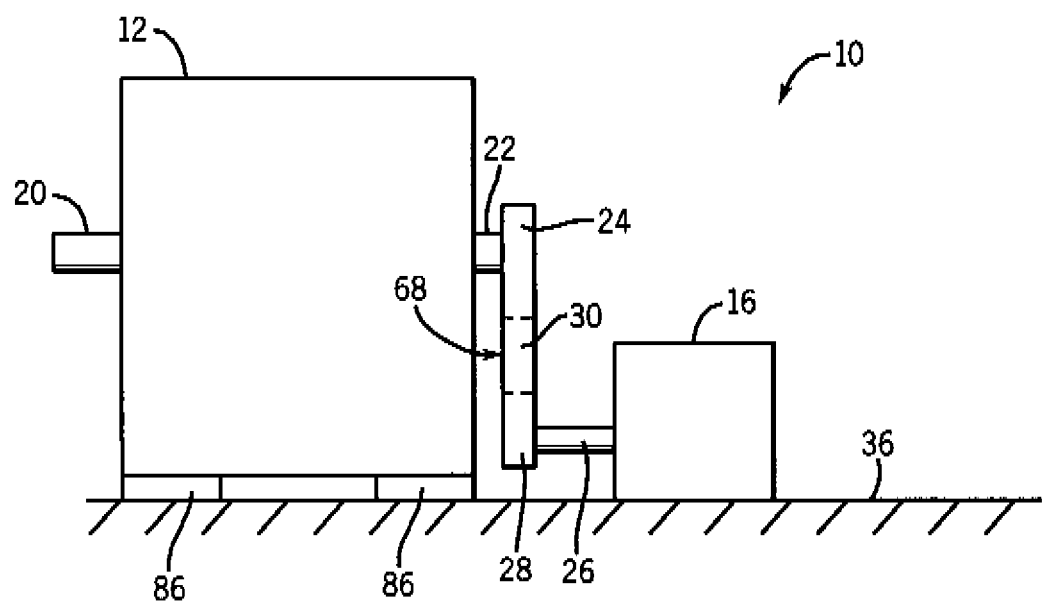
FIG. 4 is a diagram illustrating an exemplary embodiment of the welding generator/compressor system as illustrated in FIGS. 1-3.

Turning now to FIG. 4, depicted is a diagram including the engine 12 and the compressor 14 coupled via the drive belt 30. In an embodiment, as mentioned above, the engine 12 outputs power via the rotating shaft 22 and transmit the power to the air compressor 16 via the pulley 24, the drive belt 30, the compressor pulley 28, and the compressor drive shaft 26. For example, as depicted, the engine 12 rotates the drive shaft 22 and, in turn, rotates the pulley 24. The rotation of the pulley 24 is transmitted to the compressor pulley 28 via the drive belt 30. Rotation of the compressor drive shaft 26 operates the screw mechanism of the rotary screw compressor 16. In other embodiments, the system 10 may include a clutch configured to regulate the transfer of torque from the engine 12 to the compressor 16. For example, clutch mechanism may be located in-line with the compressor drive shaft 26, in-line with the drive shaft 22, within the pulley 24, and/or the compressor pulley 28. Accordingly, the engine 12 provides the power to generate compressed air via the air compressor 16.

In such a system 10, to prevent slipping of the drive belt 30 it is desirable that the drive belt 30 maintains enough tension to generate friction between the drive belt 30 and the pulleys 24 and 28. Accordingly, the system 10 may include the belt tensioner 68 configured to maintain tension and prevent slipping of the drive belt 30. Further, the belt tensioner 68 may provide a simplified method for assembly and maintenance of the drive belt 30. For instance, the tension of the belt 30 may be increased or decreased without an assembler to provide a full tension when mounting the drive belt 30 to the system 10. In an embodiment, the belt tensioner 68 may provide a biasing force configured to maintain enough pressure on the drive belt 30 to discourage the drive belt 30 from slipping on the pulleys 24 and 28.

Figure 5:
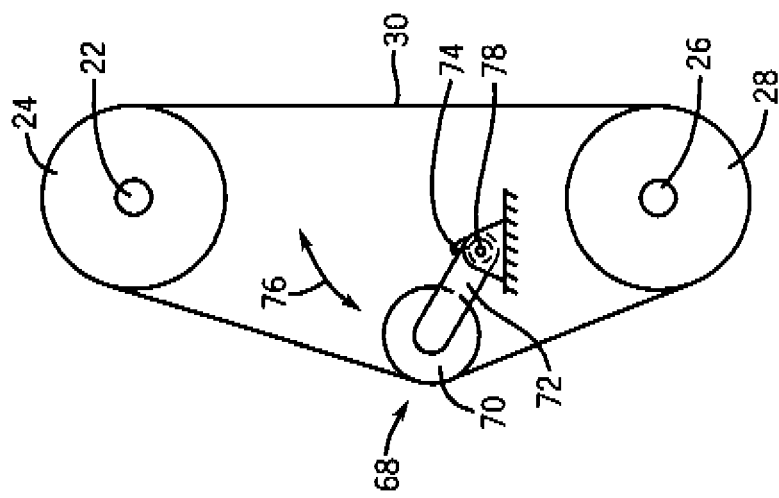
FIG. 5 is a diagram illustrating an exemplary embodiment of a belt tensioner of the welding generator/compressor system as illustrated in FIGS. 1-4.

In one embodiment as shown in FIG. 5, the belt tensioner 68 includes a tension pulley 70 configured to contact the drive belt 30 and to provide pressure against the drive belt 30. For example, as depicted in FIG. 4, the belt tensioner 68 includes a pivot arm 72 that rotates about a pivot point 74 in the direction of arrow 76. In an embodiment, the pivot point 74 of the belt tensioner 68 may be coupled to a fixed object, such as the engine 12, the air compressor 16, or the base/frame 36 via a bolt or other coupling. In the depicted embodiment, the torque to rotate the pivot arm 72 is provided by a torsion spring 78 that is positioned about an axis passing through the pivot point 74. Thus, the torque provided by the torsion spring 78 acts to force the tension pulley 70 to rotate in a counter clockwise direction of the arrow 76 and stretch the drive belt 30 to the desired tension.

Figure 6:
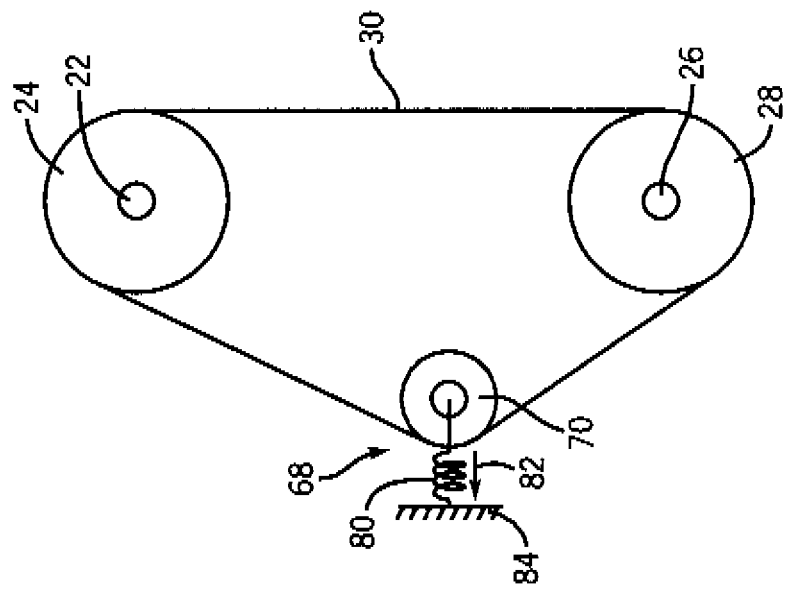
FIG. 6 is a diagram illustrating an alternate embodiment of the belt tensioner of the welding generator/compressor system as illustrated in FIGS. 1-5.

Similarly, as depicted in FIG. 6, the biasing force to create tension may be provided by a linear spring 80 coupled to the pulley 70. For instance, linear spring 80 is coupled to the belt tensioner 68 and is configured to provide a linear force in the direction of arrow 82. As further depicted, the spring is coupled to a fixed object 84, such as the engine 12, the air compressor 16, or the base/frame 36. In another embodiment, the tensioner 68 may use a pneumatic drive, a hydraulic drive, or both, to provide the desired force to provide tension in the belt 30.

The belt tensioner 68 may include any arrangement or device configured to provide a tension on the drive belt 30. For example the tension pulley 70 may be located on the outside of the drive belt 30 and provide an inward biasing force to provide tension within the drive belt 30. Further, the pivot arm 72 may be manipulated via a torque provided by a linear spring coupled along the length of the pivot arm 72. Other embodiments may include the use of a linear spring 80 in compressive as opposed to a tensile arrangement.

In another embodiment, the system 10 may include a uniquely resilient type of the drive belt 30 configured to maintain a tension without the addition of a belt tensioner 68. For example, the drive belt 30 may be described as a spring belt due to high spring-like characteristics of the belt 30. As appreciate, if the distance between the pulleys 24 and 28 change due to vibration, movement of the engine 12 and/or the compressor 16, or other variations, then the resilient or spring-like nature of the belt 30 maintains a sufficient tension as the distance increases and subsequently decreases In other words, the belt 30 may not permanently stretch out as the distance changes, thereby reducing or eliminating the need for a separate spring-driven tensioner 68. The belt 30 may include a rubber belt that is configured to shrink slightly after and initial use and maintain a tension for the life of the belt, such as those belts manufactured by Hutchison. Even with such a resilient belt 30, the belt tensioner 68 may be incorporated into the system 10 to assist in maintaining tension. However, the use of the belt tensioner 68 may not be required to account for stretching of the drive belt 30.

The system 10 may include any belt and pulley arrangement configured to transmit mechanical energy to the air compressor 16. For example, the system 10 may include a variety of pulley sizes to provide for appropriate ratios between the drive shaft 22 and the compressor drive shaft 26. For example, if the engine is operating at 4000 rpm and it is desired that the screw compressor operate at 4000 rpm, the pulley 24 and the compressor pulley 28 may have approximately the same diameter. However, if the air compressor 16 is configured to operate at 2000 rpm, the compressor pulley 28 may comprise a diameter twice the diameter of the pulley 24. Further, an embodiment, the stub shaft 22 may be configured to drive multiple devices. For example, the drive belt 30 may be routed about an additional pulley coupled to another device, such as an additional generator 14, hydraulic motor, or an additional air compressor 16. Embodiments may also include multiple drive belts 30 coupling the stub shaft 22 to multiple devices.

Returning now to the embodiment of FIG. 4, the system 10 may also include the isolators 86 located between the engine 12 and other components of the system 10, such as the base/frame 36. The isolators 86 may include a damping material configured to reduce the transmission of vibrations from the engine 12 to the base/frame 36 and other components of the system 10, such as the air compressor 16. For example, the isolators 86 may comprise a resilient material, such as an elastomer (e.g., rubber), configured to flex slightly under loading caused by the weight and vibration of the engine 12. In other embodiments, the isolators 86 may include damping mechanisms such as springs and shock absorbers.

Further, the isolators 86 may be configured such that the positioning of the engine 12 may change slightly with the addition of pressure to the engine 12 from different directions. In other words, the engine isolators 86 may flex slightly to accommodate for miss-alignments that cause pressure on different parts of the system 10 and the engine 12. For example, if the stub shaft 22 and the compressor drive shaft 26 are not parallel, then the isolators 86 may flex slightly to relieve any pressure that may be applied to the stub shaft 22. These may include pressures that are due to the drive belt 30 tension pulling the shafts 22 and 26 into alignment. Accordingly, the isolators 86 may aid in preventing premature wear of the components, such as bearings, of the system 10.

Further, the isolators 86 may be used to couple the engine 12 to the other components of the system 12. In an embodiment, the isolators 86 may include features configured to attach the engine 12 to the base/frame 36. For example, the isolators 86 may include an attachment feature, such as a bolt stud formed into the body of the isolator 86 and coupled to the engine 12 and the base/frame 36. Other embodiments may include passing a fastening mechanism, such as a bolt, through the body of the isolator 86. In an embodiment, the isolators 86 may include a disk of material that is compressed between the engine 12 and the base/frame 36. For example, the engine 12 may be mounted to the base/frame 36 via a bolt, and the isolators 86 may be compressed the engine 12 and the base/frame 36 via the tightening of the bolt. As will be appreciated, the biasing force of the isolators 86 may also act as a washer by providing a continuous pressure to prevent the bolt from backing out of the mating threads. In an embodiment, multiple isolators 86 may be located under the engine 12, such as four isolators 86 mounted near the corners of the engine 12. In an embodiment, the system 10 may comprise only a single isolator 86 located under the engine 12. For example, the isolator 86 may comprise a single sheet of material located between the engine 12 and the other components of the system 10.

In other embodiments, one or more isolators 86 (e.g., resilient mounts) may be used to couple the engine 12, the generator 14, or the compressor 16, or any combination thereof, to the frame 36. However, the compressor 16 remains separate from the engine 12 and the compressor 16 is independently mounted to the frame 36. Again, in one embodiment, the compressor 16 is rigidly coupled to the frame 36 without the one or more isolators 86, and the engine 12 is resiliently coupled to the frame 36 with the one or more isolators 86. The one or more isolators 86 may be configured to dampen vibrations, expand and compress to maintain alignment between the engine 12 and the compressor 16, or a combination thereof The system 10 may also include a bearing that has characteristics beneficial to loading that may be experienced within the system 10. One embodiment of the bearing may include an aluminum journal bearing configured to support the loads experienced by the shaft 22 or the compressor drive shaft 26. In other embodiments, a bearing may include materials with increased hardness, such as bronze or brass. The bearing may be located within the engine 12 to support the shaft 20 and 22, and/or may be located within the compressor 16 to support the compressor drive shaft 26. Accordingly, increased hardness within the bearing may help to resist wear that may otherwise be present due to the loading between the shafts 22 and 26.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a chassis;
   an engine coupled to the chassis;
   a generator coupled to the engine;
   a rotary screw compressor coupled to the chassis independent from the engine, wherein the engine is configured to drive both the generator and the rotary screw compressor; and
   a geometrically adjustable coupling disposed between a first shaft of the engine and a second shaft of the rotary screw compressor, wherein the geometrically adjustable coupling is configured to maintain a connection between the first and second shafts during relative movement between the engine and the rotary screw compressor.

2. The system of claim 1, wherein the geometrically adjustable coupling comprises a resilient belt without a tensioner, wherein the resilient belt is configured to expand and contract with variations in distance between the first shaft and the second shaft, while maintaining tension.

3. The system of claim 1, wherein the geometrically adjustable coupling comprises an adjustable tensioner configured to bias a belt or a chain.

4. The system of claim 1, comprising one or more resilient mounts coupling the engine, or the generator, or the rotary screw compressor, or any combination thereof, to the chassis with the rotary screw compressor separate from the engine and the generator.

5. The system of claim 3, wherein the adjustable tensioner comprises a spring.

6. The system of claim 3, wherein the adjustable tensioner comprises a tension pulley configured to contact the belt or chain and provide pressure against the belt or chain.

7. The system of claim 4, wherein the one or more resilient mounts are configured to dampen vibrations, expand and compress to maintain alignment between the engine and the rotary screw compressor, or a combination thereof.

8. The system of claim 4, wherein the rotary screw compressor is rigidly coupled to the chassis without the one or more resilient mounts, and the engine is resiliently coupled to the chassis with the one or more resilient mounts.

9. The system of claim 4, wherein the one or more resilient mounts comprise an elastomer.

10. The system of claim 4, wherein the one or more resilient mounts comprise one or more springs.

11. The system of claim 5, comprising a first pulley coupled to the first shaft of the engine, a second pulley coupled to the second shaft of the rotary screw compressor, and the belt or the chain disposed in tension about the first and second pulleys.

12. The system of claim 6, wherein the tension pulley is coupled to a pivot arm biased to rotate about a pivot point by a torsion spring.

13. The system of claim 6, wherein the tension pulley is coupled to a linear spring configured to bias the tension pulley against the belt or chain.

14. A system, comprising:
   a portable unit, comprising:
      a chassis;
      an engine coupled to the chassis via one or more isolators;
      a generator coupled to a first engine shaft disposed on a first side of the engine;

an air compressor coupled to a second engine shaft disposed on a second side of the engine opposite from the first side, wherein the air compressor is rigidly coupled to the chassis in mechanical isolation from the engine, the engine is configured to drive the generator and the air compressor, and the isolators are configured to enable movement of the engine relative to the air compressor and dampen vibrations;

wherein the second engine shaft of the engine is resiliently coupled to a compressor shaft of the air compressor via a resilient coupling.

15. The system of claim 14, wherein the generator, the engine, and the air compressor are arranged one after another in a horizontal arrangement along a common chassis.

16. The system of claim 14, wherein the portable unit comprises a welding control and a welding output coupled to the generator.

17. The system of claim 14, wherein the resilient coupling comprises an adjustable tensioner configured to bias a belt or a chain.

18. The system of claim 14, wherein the resilient coupling comprises a resilient belt configured to expand and contract with variations in distance between an output of the engine and an input of the air compressor, while maintaining tension.

19. A system, comprising:
a resilient engine mount configured to mechanically isolate an air compressor from an engine and a generator on a common chassis, wherein the isolation system comprises:
a resilient engine mount configured to enable movement of the engine relative to the air compressor on the common chassis; and
a geometrically adjustable coupling configured to maintain a connection between an output of the engine and an input of the air compressor despite a variation in distance between the output and the input.

20. The system of claim 19, wherein the geometrically adjustable coupling comprises a resilient belt, or an adjustable tensioner, or a combination thereof, wherein the resilient belt is configured to expand and contract with variations in distance between the output of the engine and the input of the air compressor, while maintaining tension.

21. The system of claim 19, comprising a control system having a welding control and an air compressor control.

22. A method, comprising:
isolating a rotary air compressor from an engine and a generator in a common chassis, wherein isolating comprises separately mounting the rotary air compressor and the engine with a resilient or distance adjustable connection in between rotary components, and isolating comprises resiliently mounting the engine, or the rotary air compressor, or both, to a chassis.

23. The system of claim 22, wherein the resilient or distance adjustable connection comprises an adjustable tensioner configured to bias a belt or a chain.

24. The system of claim 22, wherein the resilient or distance adjustable connection comprises a resilient belt configured to expand and contract with variations in distance between the rotary air compressor and the engine, while maintaining tension.

25. The system of claim 24, wherein the resilient belt comprises a spring belt having spring-like resilient properties.

26. The system of claim 18, wherein the resilient belt comprises a spring belt having spring-like resilient properties.

* * * * *